UNITED STATES PATENT OFFICE.

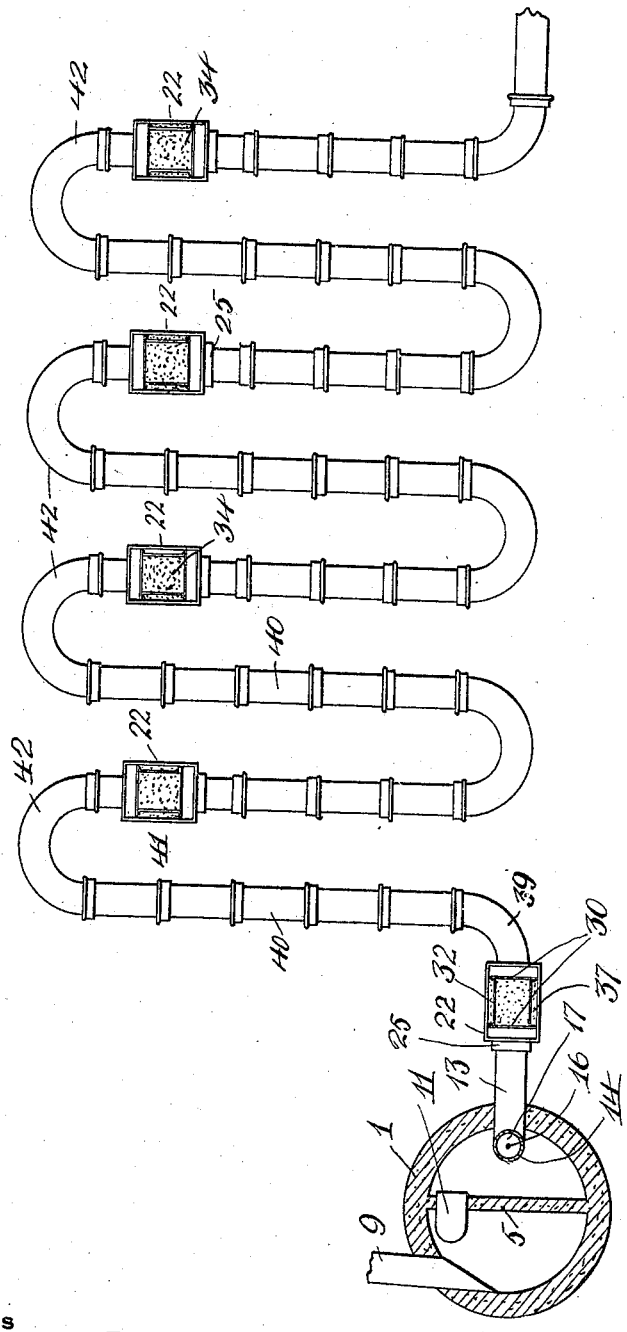

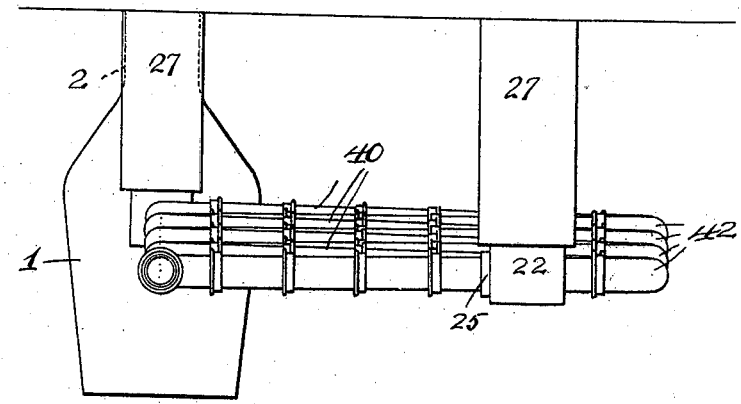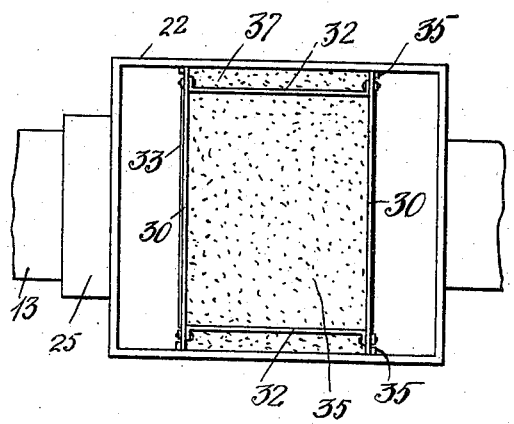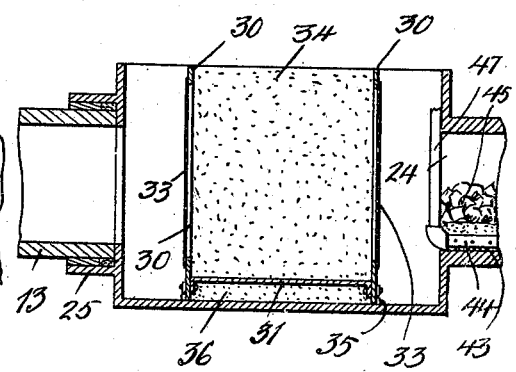

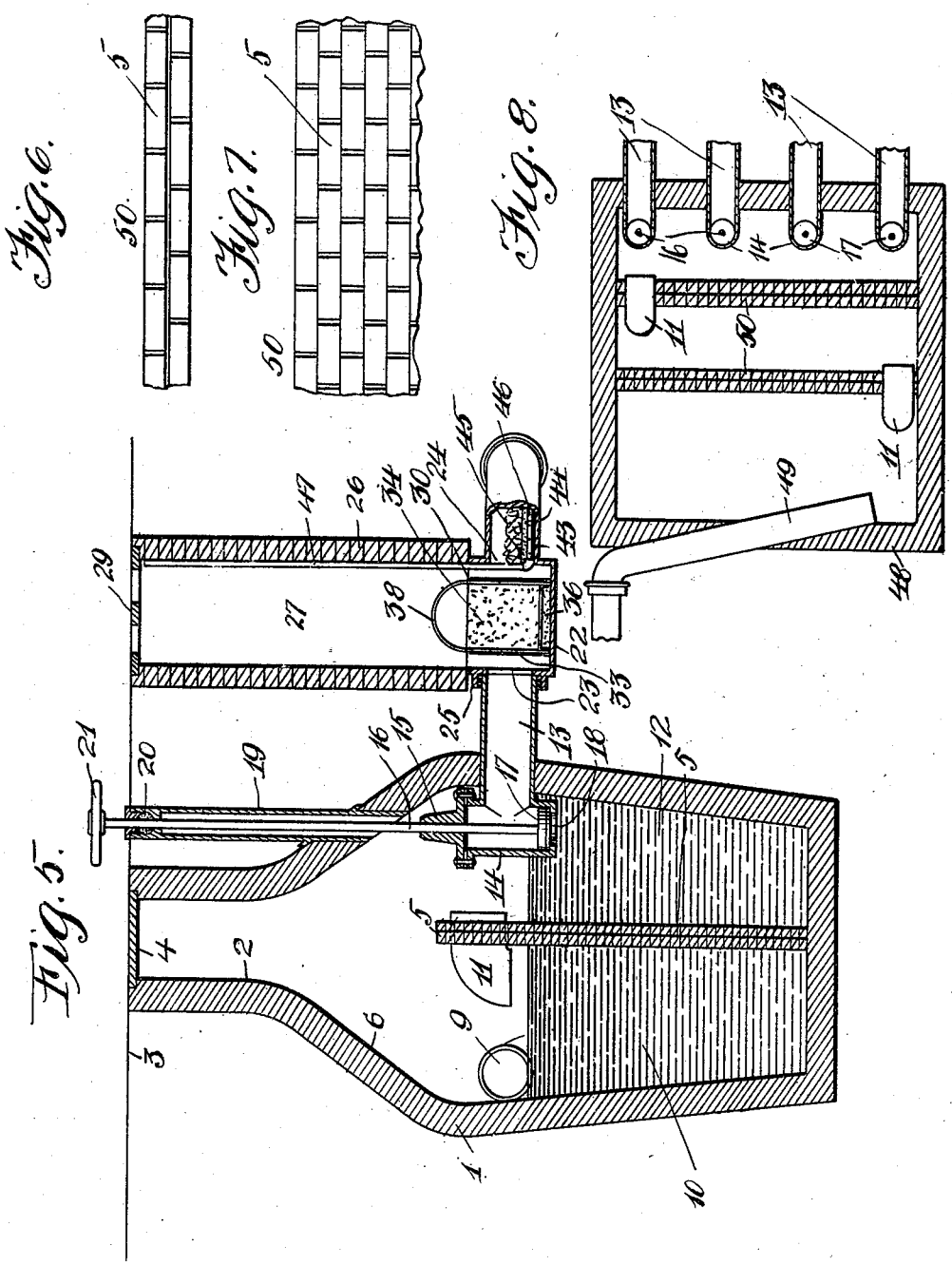

JOHN B. PAUL, OF PITTSBURG, PENNSYLVANIA.

SEWAGE DISPOSAL BY FILTRATION AND AERATION.

977,965. Specification of Letters Patent. Patented Dec. 6, 1910.

Application filed March 5, 1910. Serial No. 547,532.

*To all whom it may concern:*

Be it known that I, JOHN B. PAUL, a citizen of the United States of America, residing at Pittsburg, in the county of Allegheny and State of Pennsylvania, have invented certain new and useful Improvements in Sewage Disposal by Filtration, of which the following is a specification, reference being had therein to the accompanying drawing.

This invention relates to the disposal of sewage, and the object of my invention is to provide a filtering apparatus wherein sand, gravel, and other matter is employed for filtering sewage and removing impurities, as germs and bacteria, by a bacteriological process of aeration and filtration.

Another object of the invention is to provide a filtration plant with filtering beds that can be easily removed, aerated, or renewed.

A further object of the invention is to provide a gravity filtering apparatus that can be used by large municipalities or small towns, the apparatus consisting of units that can be increased or decreased according to the amount of sewage to be filtered.

With the above and such other objects in view as may hereinafter appear, the invention consists of the novel construction, combination and arrangement of parts to be hereinafter specifically described and then claimed.

Reference will now be had to the drawings forming a part of this specification, wherein there is illustrated the preferred embodiments of my invention, but it is to be understood that the structural elements thereof can be varied or changed, as to the size, shape and manner of assemblage without departing from the spirit and scope of the invention.

In the drawings:—Figure 1 is a plan of a filtering apparatus constructed in accordance with my invention, the septic, sedimentation, or collecting tank being shown in a horizontal section. Fig. 2 is an end view of the filtering apparatus. Fig. 3 is an enlarged plan of one of the filtering beds. Fig. 4 is a longitudinal sectional view of the same. Fig. 5 is an enlarged sectional view of the collecting tank and one of the filtering beds. Fig. 6 is a horizontal sectional view of a checkered partition or wall adapted to form part of the tank. Fig. 7 is a side elevation of the same, and Fig. 8 is a horizontal sectional view of a large septic, sedimentation, or collecting tank.

A filtering apparatus or plant constructed in accordance with my invention is arranged below the surface of the ground and at intervals provision is made whereby easy access can be had to the filtering beds for aerating and renewing the beds.

The reference numeral 1 denotes a large bottle-shaped septic, sedimentation or collecting tank having a reduced end 2 extending to the surface 3 of the ground, the upper end of said tank being closed by a detachable countersunk cover 4. The tank is preferably made of concrete and is provided with a transverse checkered wall or partition 5, extending from the bottom of the tank upwardly to the breast 6 thereof. This transverse partition or wall is made of bricks, laid in cement and spaced apart, whereby staggeredly-arranged openings will be provided to allow liquid to seep through the partition or wall. The tank 1 at one side thereof, adjacent to the breast 6, is provided with a tangentially disposed sewage inlet pipe 9 adapted to deposit sewage in the compartment 10 of the tank. The partition or wall 5 adjacent to the upper edge thereof and adjacent to the wall of the tank is provided with an over-flow elbow or pipe 11 adapted to convey sewage from the compartment 10 to the compartment 12 of the tank. The pipe 9 is tangentially disposed in order to cause a whirl at the surface of the sewage contained within the compartment 10, thus preventing a crust or hardened surface from forming on the surface of the contents of the compartment 10, while the liquid or semi-liquid sewage of the compartment 10 is adapted to pass into the compartment 12, which receives such solid matter as will settle in the bottom of the compartment prior to the contents of the compartment passing to the filtering beds.

Extending into the tank 1 at the same elevation as the sewage inlet pipe 9 is a sewage outlet pipe 13 having the inner end thereof provided with a valve body 14. This valve body is provided with a cap 15 and extending upwardly through said cap is a valve stem 16 having the lower end thereof provided with a valve 17 adapted to close the opening 18 in the bottom of the valve body 14. The valve stem 16 extends upwardly through a stand-pipe 19 carried by the breast 6 of the tank and in the upper end of the pipe 19 is a stuffing-box 20 through which the stem 16 extends and is provided with a hand-wheel 21. It is through the medium of the valve 17 that the passage of sewage into the pipe 13 can be easily controlled. The pipe 13 extends into a filtering bed, comprising a rectangular housing 22 having the ends thereof provided with openings 23 and 24, one of said openings being surrounded by a flange 25 whereby the pipe 13 can be connected to the housing. The upper end of the housing 22 is open and is surrounded by a wall 26 extending to the surface 3 of the ground, the wall 26 providing a well 27 having the upper end thereof covered by a grate or perforated plate 29 countersunk in the upper edges of the wall.

In the housing 22 is mounted a filtering cage or bed, comprising vertical frames 30 connected by a bottom plate 31 and side plates 32. The frames 30 are covered by perforated plates or fine screens 33, and the cage or bed is adapted to contain fine sand or other granular material 34. The cage is correctly positioned within the housing 22 by the lower edges of the frames 30 engaging inwardly projecting lugs 35 carried by the walls of the housing 2 adjacent to the bottom thereof. Fine sand 36 is placed between the bottom of the housing 22 and the bottom plate 31, to prevent the sewage from passing under the cage, and to prevent the sewage from passing around the sides of the cage fine sand 37 is placed between the walls of the housing 22 and the side plates 32 of the cage. The cage is provided with a bail or handle 38, whereby the cage can be easily gripped by a suitable hoisting device and removed from the well 27, either to be aerated, the sand renewed, cleansed or repaired.

Connected to the housing 22 opposite the pipe 13 is an elbow 39 adapted to be connected by a series of detachable pipes 40 to another filtering bed and cage 41, the series of detachable pipes 40, together with the housing 22 and the cage contained therein constituting one of the filtering units of my invention, and these units can be of any number, according to the capacity of the filtering apparatus. As shown in Fig. 1 of the drawings, I have arranged in a very compact manner a series of these units, and by referring to Fig. 2, it will be observed that the units are stepped in their arrangement, whereby the units in proximity to the tank will be at a greater elevation than the remaining units, the remaining units being stepped to the units farthest away from the tank 1. This arrangement of the units is provided in order that the sewage from the uppermost unit will flow through the remaining units and be eventually discharged by the lowermost unit as filtered.

As shown in Figs. 4 and 5 of the drawings, the elbows 39, pipes 40, and the U-shaped connections 42 of the filtering units are partially filled with filtering material, for instance a layer of sand 43, a layer of gravel 44, and a layer of crushed rock 45, thus providing an air space in the elbows, pipes, and U-shaped connections for the aeration, including the nitrozation of the contents of these elbows, etc. The air is adapted to pass into the air spaces through the medium of the wells and filtering beds. I reserve the right to use other filtering material than that herein mentioned and in some instances to force the air into the filtering material.

Extending into the elbows 39 and the pipes 40 of each filtering unit is a perforated pipe 46 and this pipe is connected to an air inlet pipe 47 adapted to extend upwardly in each of the wells 27 of the filtering units. These pipes are adapted to admit air to the filtering beds within the pipes 40 in order to aerate sewage passing therethrough and furnish oxygen to certain bacteria that assists in purifying sewage.

In Fig. 8 of the drawings I have shown a modification of my invention comprising a large rectangular septic, sedimentation or collecting tank 48 having a sewage inlet pipe 49, a plurality of transverse checkered partitions or walls 50 and a plurality of outlet pipes 13. Valves are adapted to be operated in connection with these pipes, whereby the passage of sewage through either of the pipes can be shut-off when it is found that one or two of the pipes will carry off and filter the sewage that flows into the tank 48. It is in connection with this tank that I desire to call attention to the fact that my invention is not limited to the arrangement of the units shown in Fig. 1 of the drawings, as where space is plentiful, the units can be laid to represent one continuous inclined pipe line having an inclination sufficient for the flow of sewage through the same by gravity.

In devising my improved filtering apparatus or plant, I not only depend upon the seepage of the sewage through granular matter that will remove certain impurities, but I provide means, for instance the checkered walls, for housing certain microörganisms, in the form of germs and bacteria, that cause the destruction of human waste matter.

Having now described my invention what I claim as new is:

1. In the disposal of sewage by filtration, a septic tank, a plurality of filtering units in communication with said tank and adapted to receive sewage from said tank to flow through said units by gravity, each unit comprising a well, a housing at the bottom of said well, a filtering cage in said housing, pipes connecting the housings of said units, and filtering material within said pipes.

2. In the disposal of sewage by filtration, a septic tank, a plurality of filtering units in communication with said tank and adapted to receive sewage from said tank to flow through said units by gravity, means in connection with said tank and adapted to control the passage of sewage into said units, each unit comprising a housing, a removable filtering cage in said housing, and pipes connecting the housings of said units.

3. In the disposal of sewage by filtration, a septic tank adapted to receive sewage, checkered walls arranged transversely of said tank, filtering units adapted to communicate with said tank and receive sewage therefrom adapted to travel through said units by gravity, means in connection with said tank and adapted to control the passage of sewage into said filtering units, each unit comprising a well, a housing at the bottom of said well, a filtering cage removably mounted in said housing, pipes adapted to connect the housings of said units, filtering material arranged within said pipes, and air inlet pipes located in said wells and adapted to extend into said pipes.

4. In the disposal of sewage by filtration, a plurality of inclined filtering units adapted to receive sewage in the uppermost unit and discharge filtered matter from the lowermost unit, each unit comprising a housing, a removable filtering cage within said housing, pipes adapted to connect said housings, and filtering material within said pipes.

5. In the disposal of sewage by filtration, a plurality of inclined filtration units adapted to receive sewage in the uppermost unit and discharge filtered matter from the lowermost unit, each unit comprising a housing, a removable filtering cage within said housing, pipes adapted to connect said housings, filtering material within said pipes, and air inlet pipes adapted to extend into the last mentioned pipes to aerate the contents thereof.

In testimony whereof I affix my signature in the presence of two witnesses.

JOHN B. PAUL.

Witnesses:
KARL H. BUTLER,
JOHN L. STEPHANY.